(12) United States Patent
Takano et al.

(10) Patent No.: US 9,614,404 B2
(45) Date of Patent: Apr. 4, 2017

(54) STATOR OF ROTARY ELECTRIC MACHINE INCLUDING RESTRICTING MEMBER FOR PREVENTING DEFORMATION OF COIL END PORTIONS AND ELECTRIC MOTOR INCLUDING SUCH STATOR

(71) Applicant: FANUC CORPORATION, Yamanashi (JP)

(72) Inventors: Shinobu Takano, Yamanashi (JP); Yohei Arimatsu, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 280 days.

(21) Appl. No.: 14/088,695

(22) Filed: Nov. 25, 2013

(65) Prior Publication Data

US 2014/0152128 A1   Jun. 5, 2014

(30) Foreign Application Priority Data

Nov. 30, 2012   (JP) .................................. 2012-262482

(51) Int. Cl.
*H02K 3/38*   (2006.01)
*H02K 3/50*   (2006.01)

(52) U.S. Cl.
CPC ................ *H02K 3/38* (2013.01); *H02K 3/50* (2013.01)

(58) Field of Classification Search
CPC .................................. H02K 3/38; H02K 3/50
USPC .................................................. 310/260, 416
See application file for complete search history.

(56) References Cited

U.S. PATENT DOCUMENTS 3,919,572 A * 11/1975 Desy ............................... 310/45
3,979,822 A    9/1976 Halm
2010/0264757 A1* 10/2010 Asou et al. ..................... 310/43

FOREIGN PATENT DOCUMENTS

| CN | 1220045 A | 6/1999 |
| JP | 47000260 | 6/1972 |
| JP | 50124106 | 9/1975 |
| JP | 52025210 | 2/1977 |
| JP | 53143901 | 12/1978 |
| JP | 5-304748 A | 11/1993 |

OTHER PUBLICATIONS

Microfilm of Japanese Utility Model Application No. 46-000937, 2 pages.
Microfilm of Japanese Utility Model Application No. 50-111585, 10 pages.
Office Action of Counterpart Japanese Application, JP 2012-262482.
Partial Translation of Office Action of Counterpart Japanese Application, JP 2012-262482.
English Translation for Abstract for Chinese Publication No. 1220045, published Jun. 16, 1999, 2 pages.

* cited by examiner

*Primary Examiner* — Terrance Kenerly
(74) *Attorney, Agent, or Firm* — Fredrikson & Bryon P.A.

(57) ABSTRACT

A stator of a rotary electric machine includes a stator core and coils. The stator core is provided with a plurality of slots extending in an axial direction and being spaced apart from one another in a circumferential direction. The coils are wound around through the slots. The coils include coil end portions which protrude outward in the axial direction from an end surface of the stator core. The stator includes a restricting member situated on an inner side of the coil end portions in the radial direction. The restricting member (Continued)

serves to prevent deformation of the coil end portions inward in the radial direction.

5 Claims, 11 Drawing Sheets

STATOR OF ROTARY ELECTRIC MACHINE INCLUDING RESTRICTING MEMBER FOR PREVENTING DEFORMATION OF COIL END PORTIONS AND ELECTRIC MOTOR INCLUDING SUCH STATOR

BACKGROUND OF THE INVENTION

1. Field of the Invention

The present invention relates to a stator of a rotary electric machine, and an electric motor including such a stator.

2. Description of Related Art

A stator used in a rotary electric machine such as a rotary electric motor includes coils wound around slots of a stator core. The coils include coil end portions that protrude outward from end surfaces of the stator core. To secure an insulation distance, the coil end portions are fixed in a state where the coil end portions are plastically deformed, such that the coil end portions are not deformed inward in a radial direction. JP-A-5-304748 discloses an apparatus that deforms coil end portions outward in a radial direction.

There is a need for a stator that can prevent in a simple manner coil end portions of the stator from being deformed inward in a radial direction.

SUMMARY OF THE INVENTION

According to a first aspect of the present application, a stator of a rotary electric machine comprising a stator core provided with a plurality of slots extending in an axial direction and being spaced apart from one another in a circumferential direction, and coils wound around through the slots, wherein the coils comprise coil end portions protruding outward in the axial direction from an end surface of the stator core, and wherein the stator comprises a restricting member situated on an inner side of the coil end portions in a radial direction, the restricting member being adapted to prevent the coil end portions from being deformed inward in the radial direction, is provided.

According to a second aspect of the present application, in the stator according to the first aspect, the restricting member has a cylindrical shape with a diameter at one end larger than a diameter at another end.

According to a third aspect of the present application, in the stator according to the first or second aspect, the restricting member comprises a flange situated at one end of the restricting member, the flange extending outward in the radial direction so as to cover an end of the coil end portions.

According to a fourth aspect of the present invention, in the stator according to any of the first to third aspects, the stator core comprises an attachment mechanism to which a binding member is attached, the binding member being adapted to bind the restricting member and the coil end portions together in the axial direction.

According to a fifth aspect, in the stator according to any of the first to fourth aspects, the coil end portions and the restricting member are covered with a molding resin.

According to a sixth aspect, an electric motor comprising the stator according to any of the first to fifth aspects, and a rotor that cooperate with the stator, is provided.

These and other objects, features and advantages of the present invention will become more apparent in light of the detailed description of exemplary embodiments thereof as illustrated by the drawings.

DETAILED DESCRIPTION OF THE INVENTION

Embodiments of the present invention will be described below with reference to the accompanying drawings. Illustrated constituent elements may be modified in size in relation to one another for better understanding of the present invention.

Figure 1:
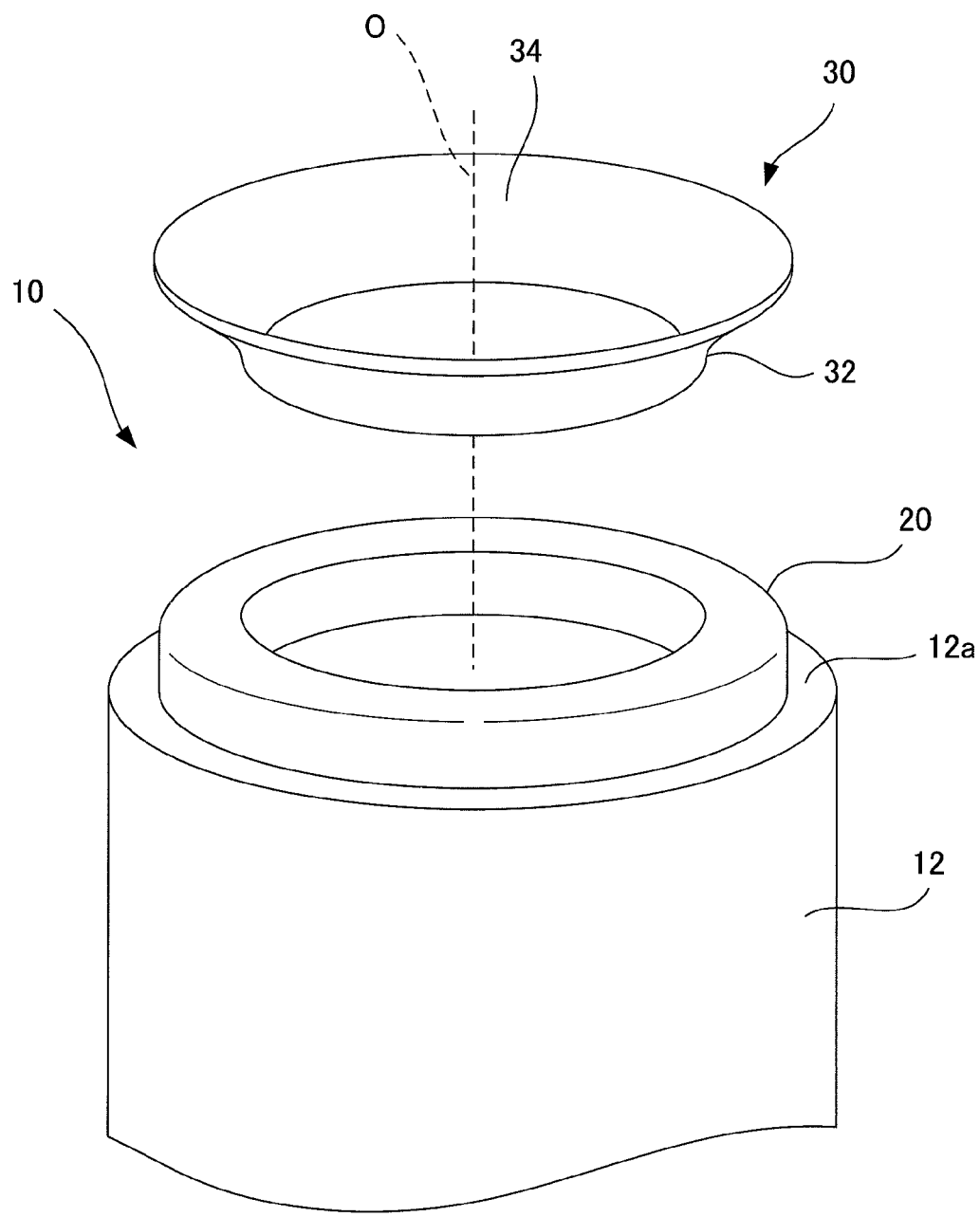
FIG. 1 is an exploded perspective view illustrating a stator according to an embodiment of the present invention.
Figure 2:
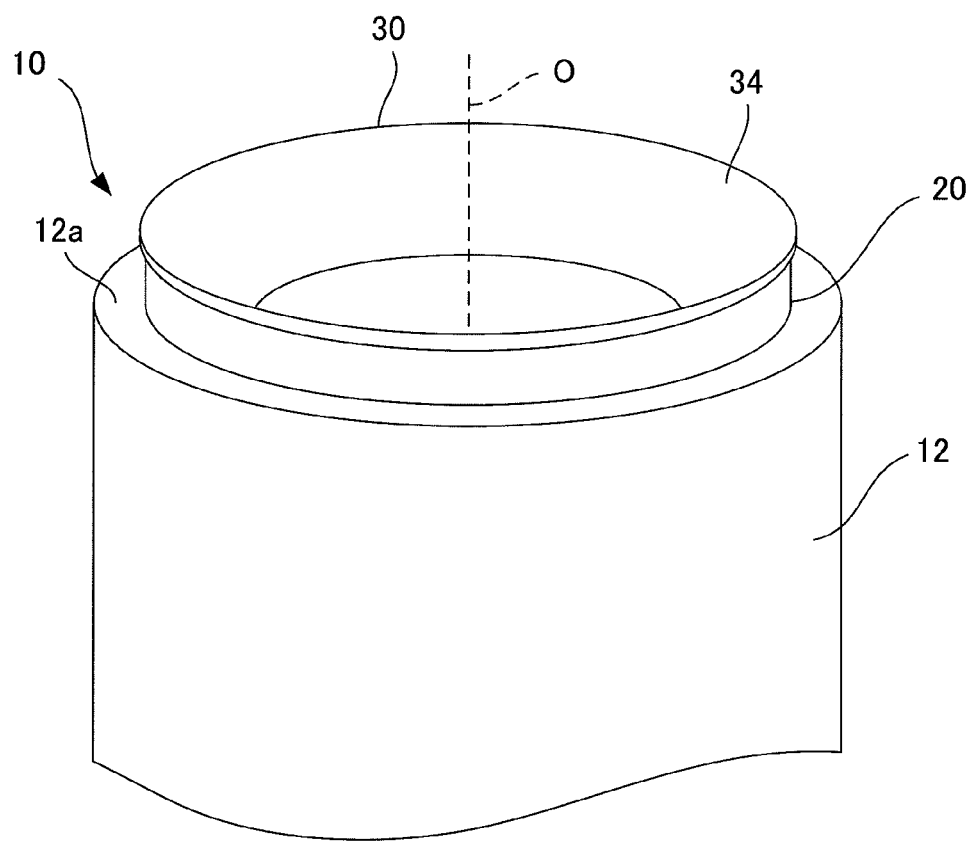
FIG. 2 is a perspective view illustrating the stator to which a restricting member has been attached.
Figure 3:
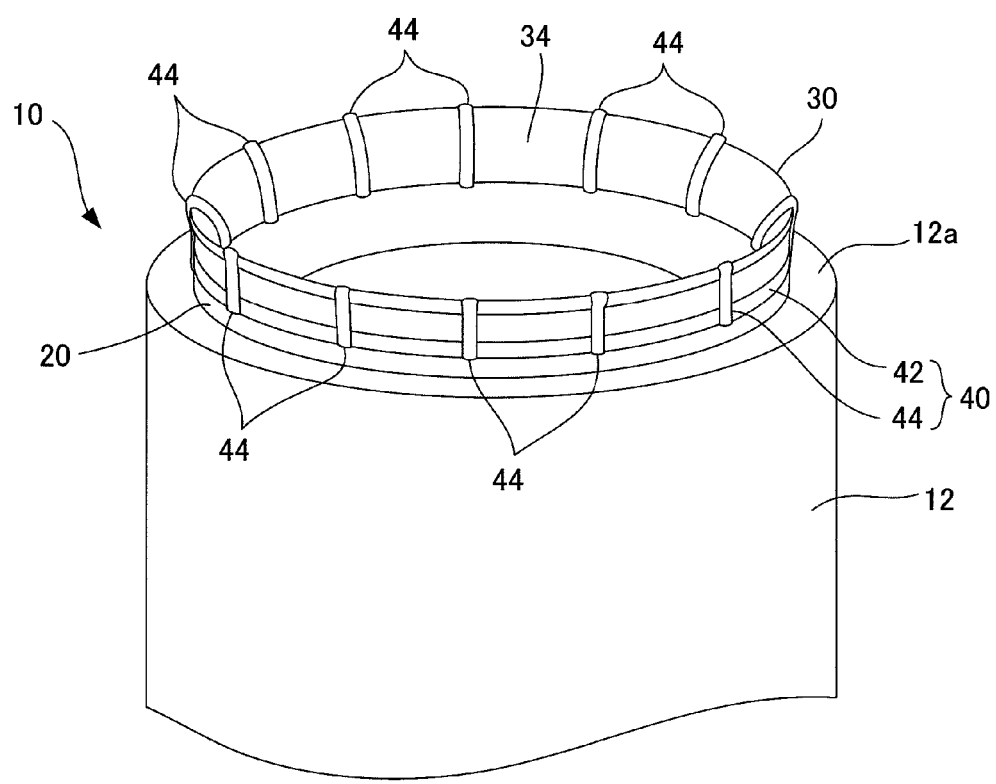
FIG. 3 is a perspective view illustrating the stator to which a binding member had been attached.

Referring to FIG. 1 to FIG. 3, a stator 10 according to an embodiment of the present invention will be described. FIG. 1 is an exploded perspective view illustrating the stator 10. FIG. 2 is a perspective view illustrating the stator 10 to which a restricting member 30 has been attached. FIG. 3 is a perspective view illustrating the stator 10 to which a binding member 40 has been attached.

The stator 10 is used together with a rotor, which is not shown, in a rotary electric machine such as a rotary electric motor. The stator 10 includes a stator core 12 formed from a stack of steel plates, and coils wound around slots formed in the stator core 12. An electric current such as a three-phase alternating current is supplied to these coils, in order to generate a rotating magnetic field. Due to a magnetic interaction between the rotating magnetic field generated on the stator side and the rotor, rotational driving power is generated to rotate the rotor.

Figure 11:
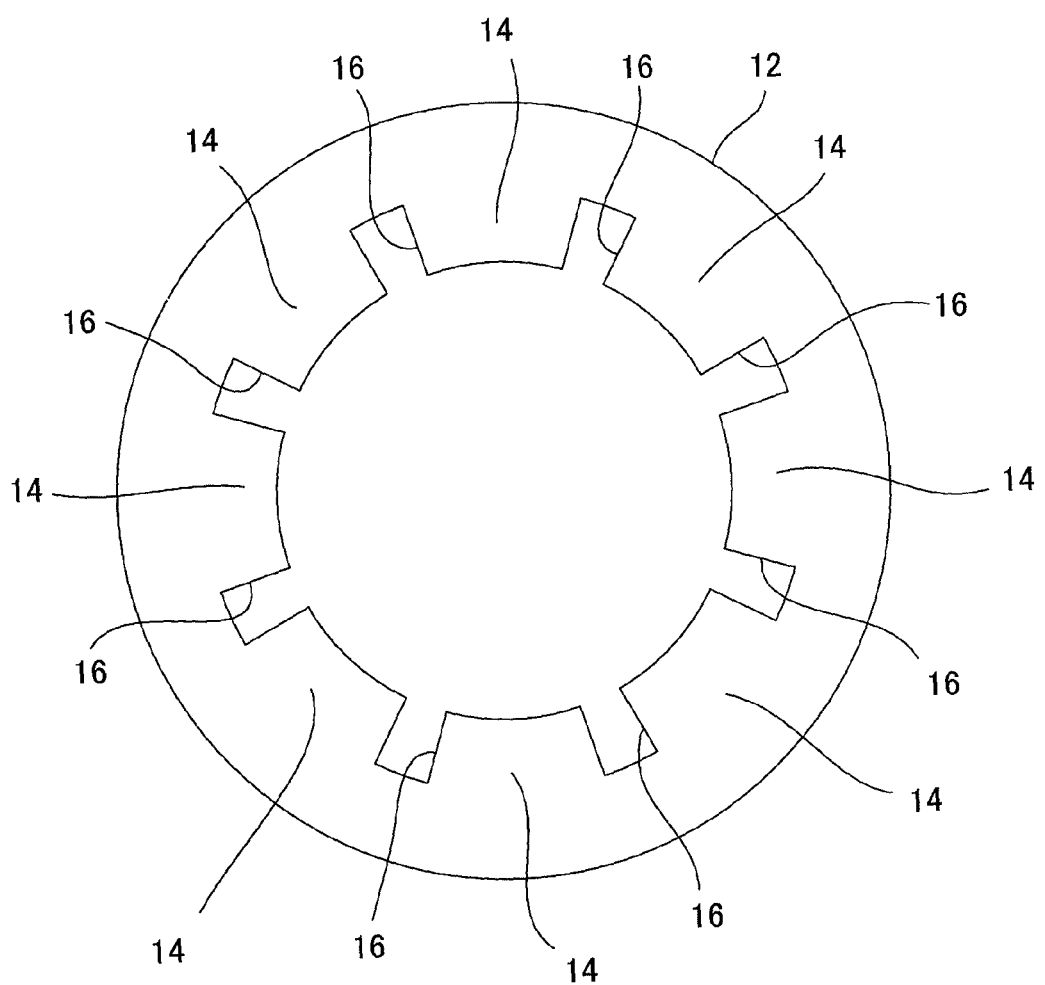
FIG. 11 is a plan view illustrating an exemplary stator core.

Although the stator core 12 of the stator 10 is not limited to any particular shape, an exemplary stator core 12 will be described with reference to FIG. 11. FIG. 11 is a plan view illustrating an example of the stator core 12. The stator core 12 includes a plurality of teeth 14 that protrude inward in a radial direction and that are spaced apart from one another in a circumferential direction. A slot 16 extending in an axial direction (i.e., a direction perpendicular to a drawing sheet) is defined between adjacent teeth 14. Electric wires of the coils of the stator 10 are wound along side surfaces of the teeth 14 through slots 16.

The coil is formed in accordance with a known method, for example, a concentrated winding or a distributed winding. Referring to FIG. 1, the coils include coil end portions 20 that protrude outward from an end surface 12a of the stator core 12 in the axial direction O. In FIG. 1, the coil end portions 20 are simply depicted as a cylindrical member.

Figure 4A:
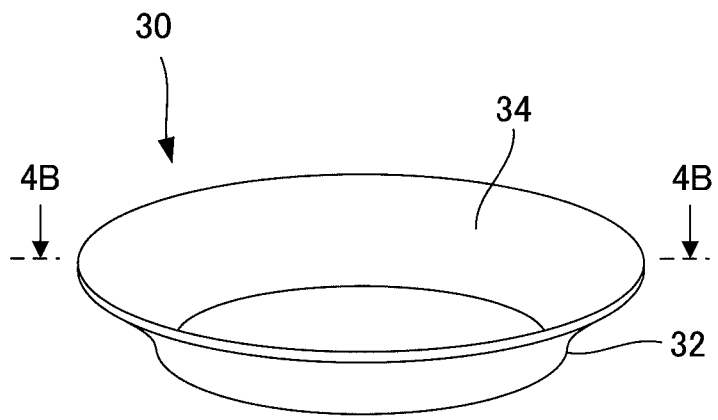
FIG. 4A is a perspective view illustrating the restricting member.
Figure 4B:
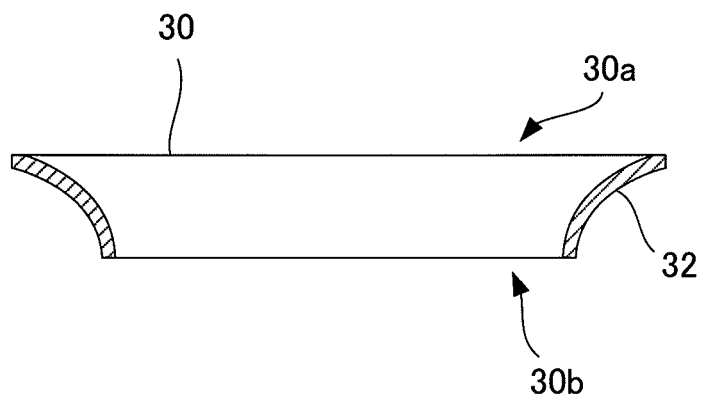
FIG. 4B is a sectional view taken along the line 4B-4B in FIG. 4A.

The restricting member 30 is formed from a material which is not easily deformed, for example, plastic or the like. The restricting member 30 generally has a cylindrical shape. As is more clearly understood with reference to FIGS. 4A and 4B, the restricting member 30 is formed such that a diameter of a first end 30a distant from the stator core 12 is larger than a diameter of a second end 30b on the opposite side. A side surface 32 of the restricting member 30 generally has a circular arc shape in cross-section. Accordingly, a diameter of the side surface 32 continuously increases from the second end 30b toward the first end 30a.

The restricting member 30 is attached to the stator 10 by pushing it into a space on the inner side of the coil end portions 20 in the radial direction, along the axial direction O. As a result, when the restricting member 30 is attached to the stator 10 as illustrated in FIG. 2, the coil end portions 20 are deformed such that a diameter of the coil end portions 20 gradually increases toward ends of the coil end portions 20 distant from the end surface 12a of the stator core 12. The side surface 32 of the restricting member 30 has a predetermined shape corresponding to a desired shape of the coil end portions 20. Therefore, as the restricting member 30 is being attached to the stator 10, the coil end portions 20 is deformed along the side surface 32 of the restricting member 30, so as to have the desired shape.

In this way, the coil end portions 20 are deformed in accordance with the shape of the side surface 32 of the restricting member 30, so as to be formed into a desired shape. According to this embodiment, there is no need for a specially designed apparatus as required in the known technique disclosed in JP-A-5-304748. As a result, no space and equipment is required to install and operate such an apparatus, thereby reducing cost. In addition, operational steps resulting from handling of the apparatus can be eliminated, and therefore working efficiency can be improved. Furthermore, as compared to the case where a jig is used to shape coil end portions, there is a less risk of damaging the electric wires of the coils. Accordingly, a more reliable stator can be provided.

In a state where the restricting member 30 is arranged in position, the restricting member 30 and the coil end portions 20 are fixed together by the binding member 40 as illustrated in FIG. 3. In the illustrated embodiment, the binding member 40 is formed from a lateral string 42 and vertical strings 44. The lateral string 42 is wound around an entire circumference of the coil end portions 20, so as to bind the coil end portions 20 and the restricting member 30 to each other in the radial direction. On the other hand, the vertical strings 44 are provided in the axial direction O and wound around an inner surface 34 of the restricting member 30 and the coil end portions 20. The vertical strings 44 have functions of binding the coil end portions 20 and the restricting member 30 to each other in the axial direction O. Further, the lateral string 42 and the vertical strings 44 are connected to each other to hold the coil end portions 20 and the restricting member 30 in position in the axial direction as well as in the radial direction.

The binding member used in the embodiment of the present invention is not limited to the specific configuration illustrated in the drawing. For example, although the illustrated vertical strings 44 are generally provided along the axial direction O, the vertical strings 44 may also be wound around so as to be inclined with respect to the axial direction O, i.e., so as to be wound around in a helical manner with respect to the coil end portions 20. Alternatively, a binding band such as a tie wrap may also be used as a vertical string. The number of the binding members is not limited to any particular configuration, and can be determined as necessary. In a similar manner, a binding member in any other known form can be adopted for the binding member.

In one embodiment, the coil end portions 20 and the restricting member 30 may be covered by a molding resin. The molding resin fastens the coil end portions 20 and the restricting member 30 together, and thus displacement of the coil end portions 20 and the restricting member 30 can be prevented. The molding resin is formed by means of a mold or other jig over a range necessary to fasten the coil end portions 20 and the restricting member 30 together. The molding resin may be provided with or without the binding member.

As described above, according to the present embodiment, by providing the restricting member on the inner side of the coil end portions in the radial direction, the coil end portions can be prevented from being deformed inward in the radial direction. This ensures that an insulation distance on the inner side of the coil end portions is established, and thus, a reliable stator can be provided. Since the coil end portions are subjected to deformation in accordance with the shape of the restricting member, the coil end portions can be easily formed into a desired shape without a special apparatus and skilled artisan. Furthermore, there is no risk of excessively deforming the coil end portions, and thus, the coil end portions can be prevented from being damaged. With this simplified process for shaping the coil end portions, working efficiency can be improved, and cost can be reduced.

Next, other embodiments of the present invention will be described. It should be noted that matters that have already been described above may be omitted from the following explanation. The same or corresponding constituent elements are designated with the same reference numerals.

Figure 5:
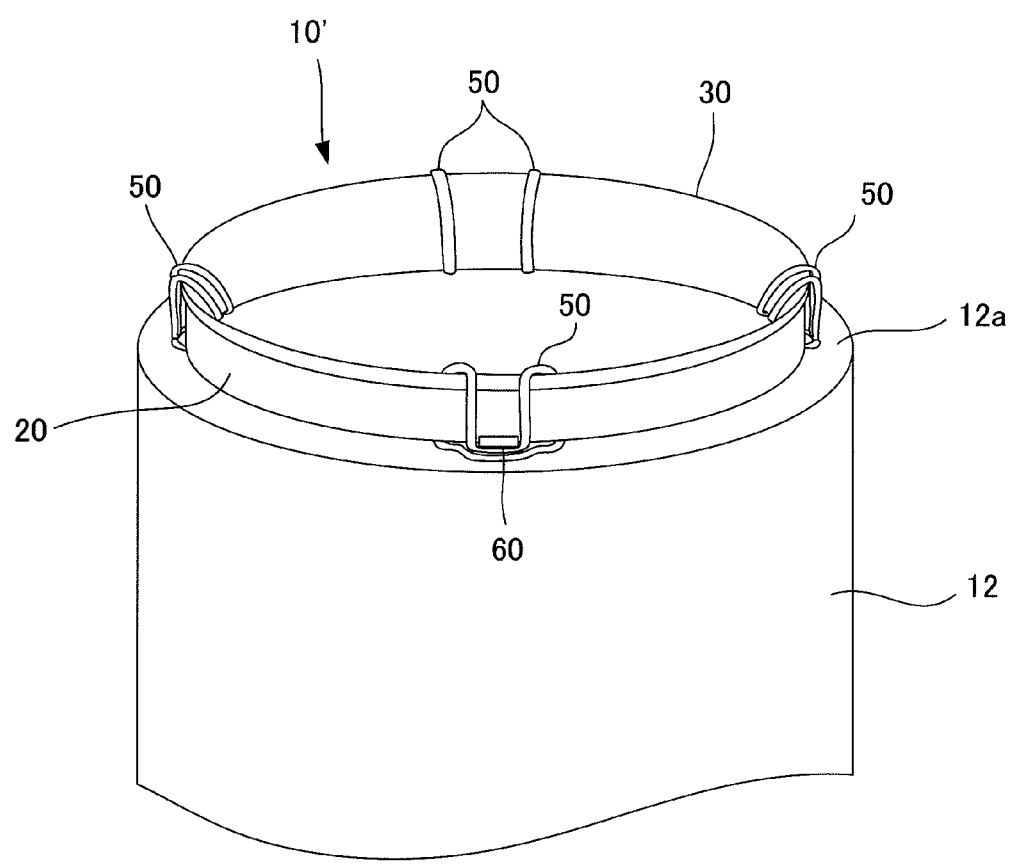
FIG. 5 is a perspective view illustrating a stator according to another embodiment of the present invention.

FIG. 5 is a perspective view illustrating a stator 10' according to another embodiment of the present invention. In the stator 10' according to this embodiment, a configuration of a binding member 50 for binding the coil end portions 20 and the restricting member 30 to each other is different from that of the binding member 40 in the embodiment described above with reference to FIGS. 1 to 3. The binding member 50 is generally a circular-ring string. The binding member 50 is fixed by, for example, an attachment mechanism 60 formed on the end surface 12a of the stator core 12 in a state where the binding member 50 is wound around the coil end portions 20 and the restricting member 30.

Figure 6:
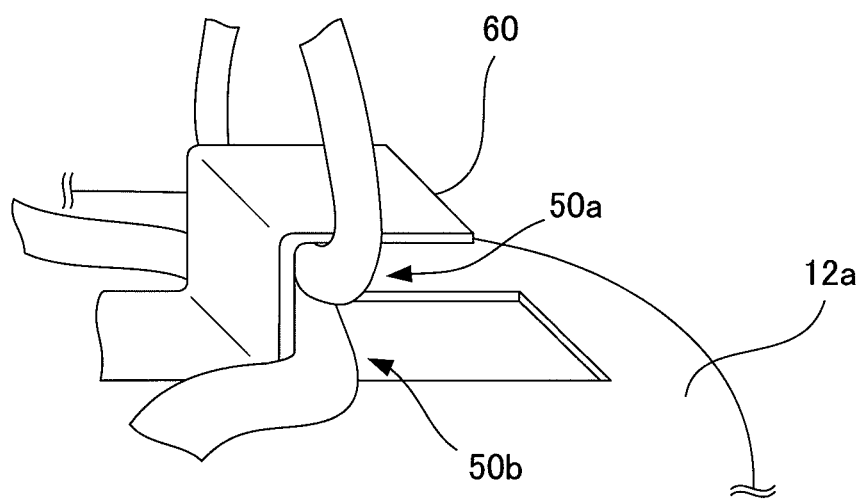
FIG. 6 is a partially enlarged view illustrating an attachment mechanism for a binding member.

FIG. 6 is a partially enlarged view illustrating the attachment mechanism 60 for the binding member 50. A first arc portion 50a extending over an arc part of the binding member 50, and a second arc portion 50b positioned diametrically opposite to the first arc portion 50a are hung on and held by the attachment mechanism 60. In this way, the binding member 50 is attached with the coil end portions 20 and the restricting member 30 being fastened to each other. In the illustrated embodiment, the attachment mechanism 60 is in the form of a hook that protrudes the outside of the end surface 12a of the stator core 12. The attachment mechanism 60 is formed by, for example, providing a steel plate used for the end surface 12a of the stator core 12 with a U-shaped slit, and bending the U-shaped cut slit into an L-shape from the end surface 12a. Alternatively, the attachment mechanism 60 may be made of a separate member from the stator core 12. Of course, the attachment mechanism that facilitates attachment of the binding member is not limited in any way by the illustrated shape and arrangement, and the number used in the illustrated embodiment.

Figure 7A:
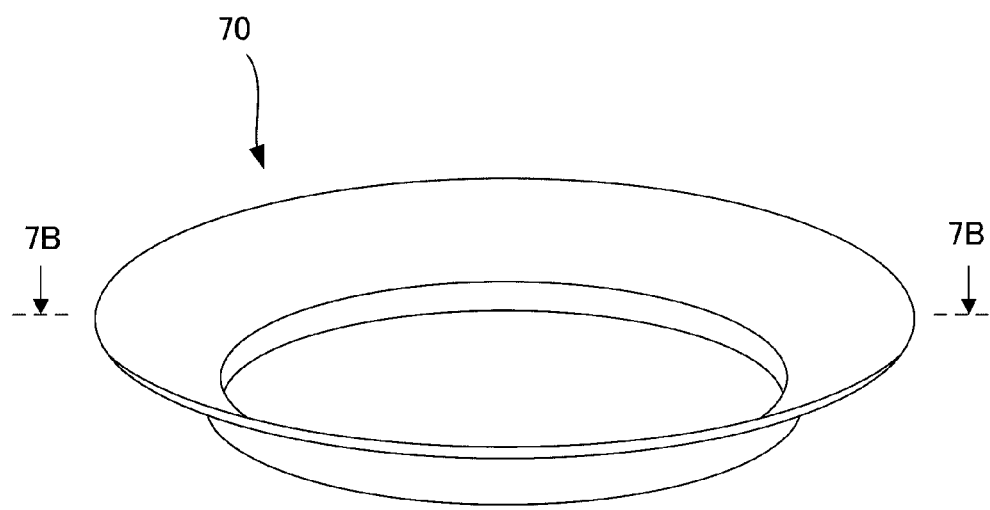
FIG. 7A is a perspective view illustrating an exemplary restricting member.
Figure 7B:
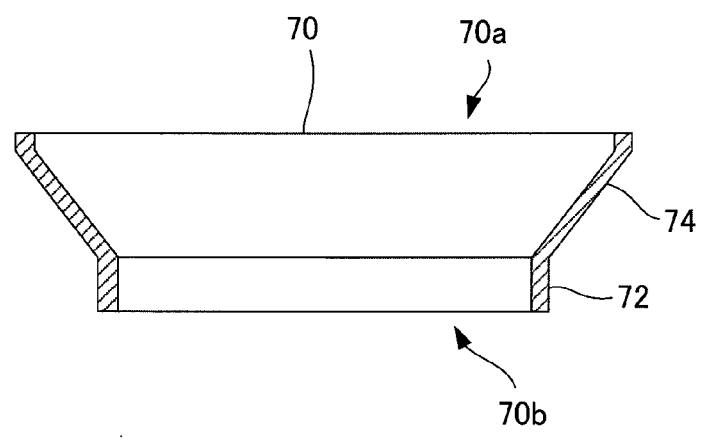
FIG. 7B is a sectional view taken along the line 7B-7B in FIG. 7A.

Referring to FIG. 7A to FIG. 10B, other exemplary restricting members will be described. A restricting member 70 illustrated in FIGS. 7A and 7B is a variant of the restricting member 30 of FIGS. 4A and 4B. Similarly as the above-described restricting member 30, the restricting member 70 is configured such that a diameter at a first end 70a is larger than a diameter at a second end 70b. However, the restricting member 70 includes a vertical side face 72 and an inclined side face 74. The vertical side face 72 extends in the vertical direction so as to have a constant diameter near the second end 70b. The inclined side face 74 is inclined such that a diameter of the inclined side face 74 continuously increases from an end of the vertical side face 72 toward the first end 70a.

Figure 8A:
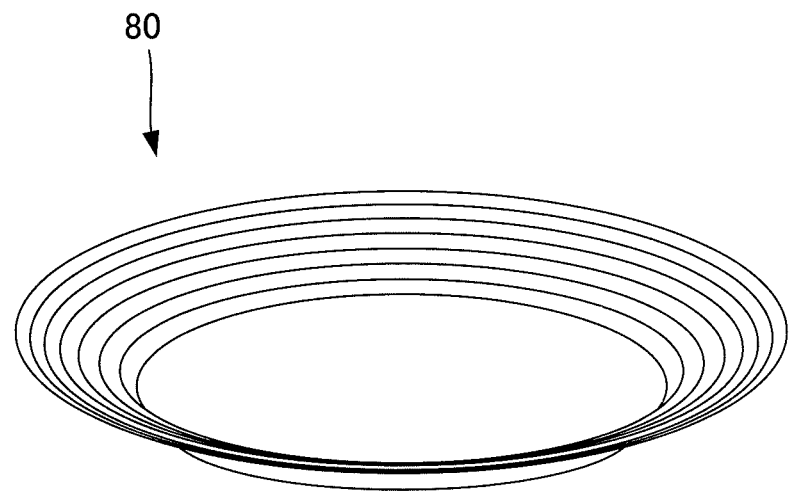
FIG. 8A is a perspective view illustrating an exemplary restricting member.
Figure 8B:
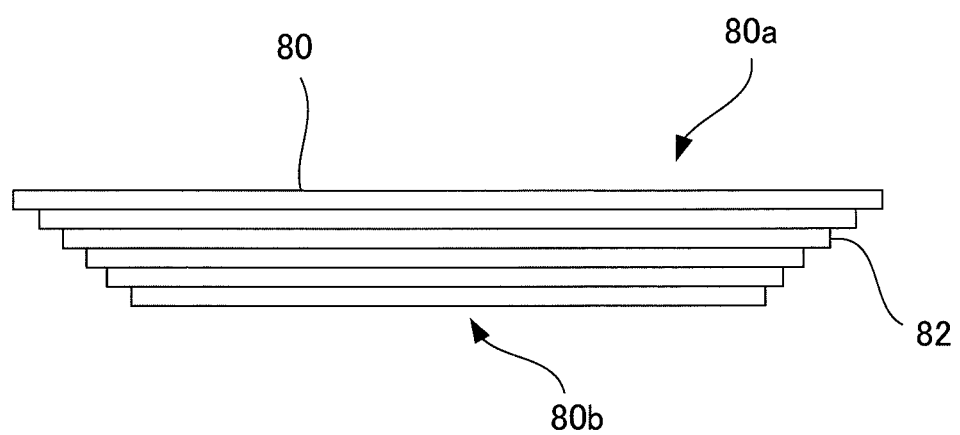
FIG. 8B is an elevation view illustrating the restricting member of FIG. 8A.

The restricting member 80 shown in FIGS. 8A and 8B is also configured such that a diameter at a first end 80a is larger than a diameter at a second end 80b, similarly as other restricting members. However, the restricting member 80 has a stepped side face 82 having a diameter that increases stepwise from the second end 80b toward the first end 80a.

Figure 9A:
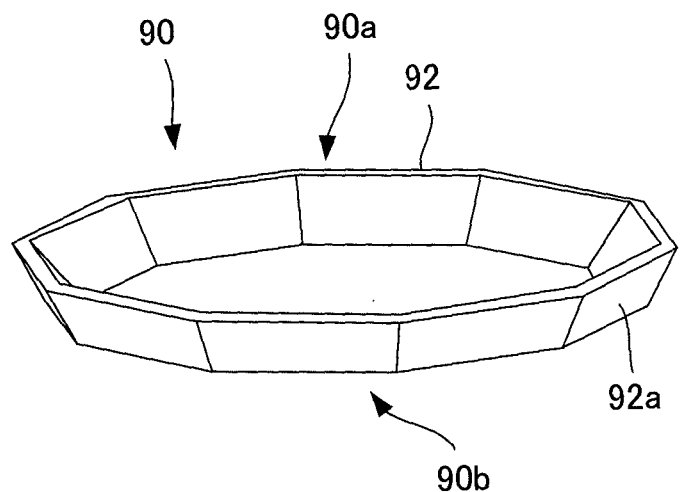
FIG. 9A is a perspective view illustrating an exemplary restricting member.
Figure 9B:
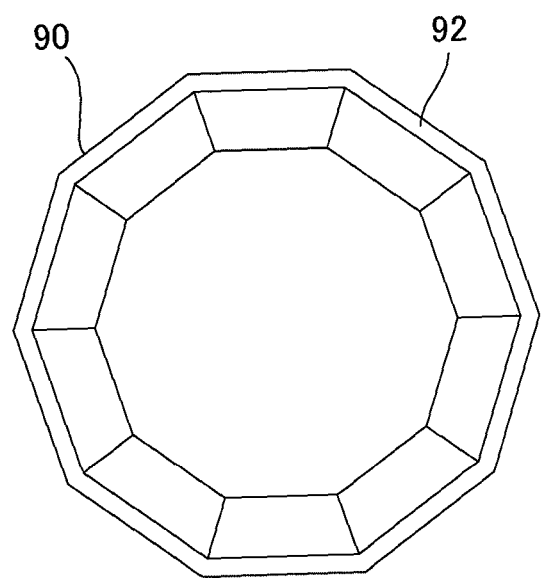
FIG. 9B is a plan view illustrating the restricting member of FIG. 9A.

The restricting member 90 shown in FIGS. 9A and 9B is also configured such that a diameter at a first end 90a is larger than a diameter at a second end 90b, similarly as other restricting members. However, the restricting member 90 includes a peripheral wall portion 92 having a shape of a regular polygon, for example, a regular decagon in plan view (see FIG. 9B). The peripheral wall portion 92 includes a side face 92a which is inclined over a range between the first end 90a and the second end 90b.

Figure 10A:
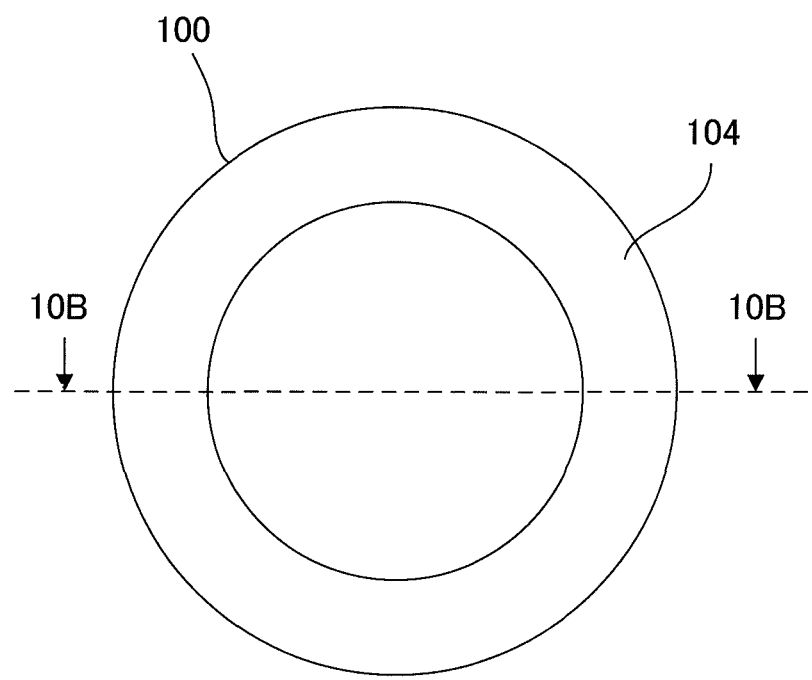
FIG. 10A is a perspective view illustrating an exemplary restricting member.
Figure 10B:
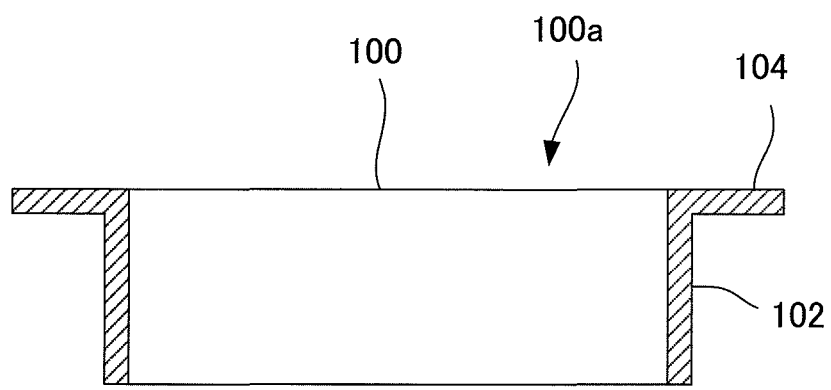
FIG. 10B is a sectional view taken along the line 10B-10B in FIG. 10A.

A restricting member 100 shown in FIGS. 10A and 10B includes a substantially cylindrical side wall 102, and a flange 104 extending radially outwardly at one end 100a of the restricting member 100. The flange 104 protrudes from the side wall 102 over a length sufficient to cover at least part of an end of the coil end portions of the stator. Accordingly, in a state where the restricting member 100 is attached on the inside of the coil end portions in a radial direction, at least part of the coil end portions is covered by the restricting member 100 in plan view. In this way, the restricting member 100 provided with the flange 104 extending outward in the radial direction serves to restrict a position of the coil end portions in a height direction (i.e., the axial direction). This ensures an insulation distance at the end of the coil end portions is established. Since the flange 104 of the restricting member 100 is configured so as to at least partially cover the end of the coil end portions, the flange 104 serves to protect the coil end portions. Such a flange may also be provided as necessary to any of the restricting members 30, 70, 80, and 90 according to the above-described other embodiments. This allows the above-described advantage to be achieved similarly.

With any of the restricting members 70, 80, 90, and 100 having the various configurations as described above with reference to FIGS. 4A, 4B, and 7A to 10B, the coil end portions can be formed into a desired shape, and inward deformation of the coil end portions in a radial direction can be prevented. These various restricting members are explained by way of example, and thus it should be noted that a restricting member that can be applied to the present invention is not limited to any of the particularly illustrated restricting member.

EFFECT OF THE INVENTION

According to the above-described invention of the present application, as opposed to the known technique disclosed in JP-A-5-304748, which requires a specially designed apparatus, the coil end portions can be formed into a desired shape with the aid of the restricting member. Further, even when force acts on the coil end portions inward in the radial direction, deformation of the coil end portions can be prevented by the restricting member, and thus an insulation distance on the inner side of the coil end portions can be maintained.

Although the invention has been shown and described with exemplary embodiments thereof, it should be understood by those skilled in the art that the foregoing and various other changes, omissions and additions may be made therein and thereto without departing from the spirit and scope of the invention.

What is claimed is:

1. A stator of a rotary electric machine comprising a stator core provided with a plurality of slots extending in an axial direction and being spaced apart from one another in a circumferential direction, and coils wound around through the slots,
   wherein the coils comprise coil end portions protruding outward in the axial direction from an end surface of the stator core,
   wherein the stator comprises a restricting member situated on an inner side of the coil end portions in a radial direction, the restricting member being adapted to prevent the coil end portions from being deformed inward in the radial direction,
   wherein the stator core comprises an attachment mechanism to which a circular-ring binding member is attached, the binding member being adapted to bind the restricting member and the coil end portions together in the axial direction, and
   wherein the attachment mechanism is in the form of a hook to facilitate ease of attachment of the binding member to the stator core, and
   the binding member includes a first arc portion extending over an arc part of the binding member, and
   a second arc portion positioned diametrically opposite to the first arc portion, the first arc portion and the second arc portion being hung on and held by the attachment mechanism.

2. The stator according to claim 1, wherein the restricting member has a cylindrical shape with a diameter at one end larger than a diameter at another end.

3. The stator according to claim 1, wherein the restricting member comprises a flange situated at one end of the restricting member, the flange extending outward in the radial direction so as to cover an end of the coil end portions.

4. The stator according to claim 1, wherein the coil end portions and the restricting member are covered with a molding resin.

5. An electric motor comprising the stator according to claim 1, and a rotor that cooperate with the stator.

* * * * *